(12) United States Patent
Pedone et al.

(10) Patent No.: US 12,154,180 B2
(45) Date of Patent: *Nov. 26, 2024

(54) APPLICATION PROGRAMMING INTERFACE FOR PROVIDING COMMON USER INTERFACE ACCESS TO DATA FROM SEPARATE SYSTEMS

(71) Applicant: TRUIST BANK, Charlotte, NC (US)

(72) Inventors: Jason Pedone, Raleigh, NC (US); Sudhakar Swaminathan, Duluth, GA (US); Raghavendra P. Narasimhan, Cary, NC (US)

(73) Assignee: Truist Bank, Charlotte, NC (US)

(*) Notice: Subject to any disclaimer, the term of this patent is extended or adjusted under 35 U.S.C. 154(b) by 141 days.

This patent is subject to a terminal disclaimer.

(21) Appl. No.: 17/592,001

(22) Filed: Feb. 3, 2022

(65) Prior Publication Data
US 2022/0318926 A1 Oct. 6, 2022

Related U.S. Application Data

(60) Provisional application No. 63/167,790, filed on Mar. 30, 2021.

(51) Int. Cl.
*G06Q 40/12* (2023.01)
*G06F 9/54* (2006.01)

(52) U.S. Cl.
CPC ............ *G06Q 40/12* (2013.12); *G06F 9/547* (2013.01)

(58) Field of Classification Search
CPC ................................. G06Q 40/12; G06F 9/547
See application file for complete search history.

(56) References Cited

U.S. PATENT DOCUMENTS 10,621,563 B1 * 4/2020 Spindel ............... G06Q 20/322
2007/0057038 A1 3/2007 Gannon
(Continued)

FOREIGN PATENT DOCUMENTS

JP 2004078383 A * 3/2004

OTHER PUBLICATIONS

Non-Final Office Action, U.S. Appl. No. 17/825,128, filed Mar. 27, 2023, 32 pages.
(Continued)

*Primary Examiner* — Bennett M Sigmond
*Assistant Examiner* — Bolko M Hamerski
(74) *Attorney, Agent, or Firm* — Kilpatrick Townsend & Stockton LLP; Michael A. Springs (57) ABSTRACT

A system can include a first financial account data system that may include first account data. The first financial account data system can perform a function according to a first process using the first account data. The system can include a second financial account data system that can include second account data that is unintegrated with the first account data. The second financial account data system can perform a function according to a second process, which can be different than the first process, using the second account data. The system can include a server with an application programming interface. The server can determine a data system among the first and second financial account data systems with which to execute a requested function received via a common user interface. The server can execute the requested function. The server can provide a result of the execution via the common user interface.

14 Claims, 7 Drawing Sheets

(56) References Cited

U.S. PATENT DOCUMENTS

| | | | |
|---|---|---|---|
| 2008/0167966 A1 | 7/2008 | Ramsdale et al. | |
| 2010/0191633 A1* | 7/2010 | Nuzum | G06Q 40/02 705/35 |
| 2012/0078791 A1* | 3/2012 | Huang | G06Q 40/12 705/44 |
| 2012/0310760 A1* | 12/2012 | Phillips | G06Q 20/3278 705/26.1 |
| 2014/0089185 A1* | 3/2014 | Desai | G06Q 10/067 705/41 |
| 2014/0160908 A1 | 6/2014 | Hino et al. | |
| 2015/0066719 A1* | 3/2015 | Agrawal | G06Q 40/02 705/35 |
| 2015/0160908 A1* | 6/2015 | Herren | G06Q 40/02 345/1.1 |
| 2015/0254645 A1* | 9/2015 | Bondesen | G06Q 20/385 705/41 |
| 2017/0068936 A1* | 3/2017 | Kendall | G06Q 20/42 |
| 2017/0078259 A1* | 3/2017 | Kumar | H04L 67/59 |
| 2017/0116672 A1* | 4/2017 | Chen | G06Q 40/06 |
| 2018/0034811 A1* | 2/2018 | Meng | H04L 63/0815 |
| 2018/0267847 A1* | 9/2018 | Smith | H04L 67/125 |
| 2018/0336543 A1* | 11/2018 | Van Os | G06Q 20/108 |
| 2019/0080309 A1* | 3/2019 | Goodwin | G06Q 20/401 |
| 2019/0259098 A1* | 8/2019 | Gurunathan | G06Q 20/24 |
| 2019/0318122 A1* | 10/2019 | Hockey | G06Q 20/3221 |
| 2019/0362086 A1* | 11/2019 | VanLoo | H04L 63/102 |
| 2022/0270174 A1* | 8/2022 | Quaintance | H04L 9/0863 |
| 2023/0020285 A1* | 1/2023 | Thome | G06Q 20/102 |

OTHER PUBLICATIONS

Non-Final Office Action, U.S. Appl. No. 17/825,128, filed Aug. 23, 2022, 14 pages.

Final Office Action, U.S. Appl. No. 17/825,128, filed Dec. 12, 2022, 19 pages.

Final Office Action, U.S. Appl. No. 17/825,128, filed Oct. 4, 2023, 37 Pages.

Non-Final Office Action, U.S. Appl. No. 17/682,304, filed Aug. 18, 2023, 32 pages.

Final Office Action, U.S. Appl. No. 17/682,304, filed Feb. 23, 2024, 34 pages.

Notice of Allowance, U.S. Appl. No. 17/825,128, filed Feb. 22, 2024, 18 pages.

Advisory Action, U.S. Appl. No. 17/682,304, filed Apr. 10, 2024, 4 pages.

* cited by examiner

APPLICATION PROGRAMMING INTERFACE FOR PROVIDING COMMON USER INTERFACE ACCESS TO DATA FROM SEPARATE SYSTEMS

CROSS-REFERENCE TO RELATED APPLICATION

This claims priority to U.S. Provisional Application Ser. No. 63/167,790, filed Mar. 30, 2021 and titled "Application Programming Interface for Providing Common User Interface Access to Data from Separate Systems," the contents of which are incorporated herein by reference.

TECHNICAL FIELD

The present disclosure relates computer network technology and, more particularly (although not necessarily exclusively), to allowing separate systems to be accessed via a common user interface provided by an application programming interface.

BACKGROUND

Separate data systems can include different types of data in different formats. Integrating data from separate systems may be an involved process that takes a significant amount of time, and is often a technically challenging process. Even data in the separate systems that is the same type may be in different formats or represented differently. When two entities, even entities that focus on the same thing, combine in some manner, often the data in the separate systems of the entities is in different formats. Integrating the data may be technically involved and may take a significant amount of time. In the interim—i.e., between combination of the entities, but before system integration—the separate systems often use different access points or other different systems that can confuse users and otherwise preclude the full combination of the entities from a user-facing perspective.

SUMMARY

In one example, a system can include a first financial account data system that may have first account data stored thereon and that can be configured to perform one or more functions. The functions can include a first process and may use first account data. The system can also include a second financial account data system that may store that can be unintegrated with the first account data. The second financial account data system can be configured to perform one or more functions. The functions can include performing a second process and may involve using the second account data. The second process can be different than the first process. The system can additionally include a server that includes a processor device and a non-transitory computer-readable memory having an application programming interface that can perform operations that may be executable by the processor device. The server can determine a data system, among the first financial account data system and the second financial account data system, that may be used to execute a requested function received via a common user interface. The server can cause the requested function to be executed using the data system and the first process or the second process. The server can provide a result from execution of the requested function to be outputted for display via the common user interface.

In another example, a server includes a processor device and a non-transitory computer-readable memory that includes an application programming interface that is executable by the processor device to cause the server to perform operations. The server can determine a data system, among a first financial account data system and a second financial account data system, with which to execute a requested function received via a common user interface. The first financial account data system can include first account data stored thereon and being configured to perform at least one function according to a first process and using the first account data. The second financial account data system can include second account data stored thereon that can be unintegrated with the first account data and can be configured to perform at least one function according to a second process and using the second account data. The second process can be different than the first process, can cause the requested function to be executed using the data system and the first process or the second process, and can provide a result from execution of the requested function to be outputted for display via the common user interface.

In a further example, a user interface server can include a processor device and a non-transitory, computer-readable memory that may include instructions that can be executable by the processor device to cause the user interface server to perform operations. The user interface server can output a common user interface for accessing data and performing functions with a first financial account data system and a second financial account data system. The first financial account data system may store a first account data and may be configured to perform a function according to a first process that may use the first account data. The second financial account data system may store second account data that can be unintegrated with the first account data, the second financial account data system may be configured to perform a function according to a second process and may use the second account data. The second process may be different than the first process. The user interface server may also be configured to provide a request for a function, that can be received via the common user interface, to an application programming interface that may be on a system configured to communicatively couple to the first financial account data system and the second financial account data system. The user interface server may also be configured to receive a result from execution of the request for the function using the first process or the second process. The user interface server may output the result of the function via the common user interface.

DETAILED DESCRIPTION

Certain aspects and features relate to providing common user interface access to data from separate systems using an application programming interface (API) to cause requested functions to be executed. The common user interface may be a commonly labeled user interface that can transmit requests for functions to be performed for financial systems included in the separate financial systems. The financial systems may include account data that are being integrated, or that are planned to be integrated, with other account data, but that are not yet integrated with the other account data. The API may be communicatively coupled, through a network or other subsystem, to the common user interface and to the separate financial systems. The API may be configured to make API calls to the separate financial systems for accessing user accounts included in the separate financial systems and for causing requested functions to be executed based on input from the common user interface. The requested functions may include various financial functions such as transferring money, paying bills, and the like, and the requested functions may be associated with distinct processes that are associated with respective financial systems.

The separate financial systems may include account data that is desired to, or is scheduled to, be integrated at a future date but is not currently integrated. Integrating the account data may span a certain time period, and, in some examples, the integration may span from a few days to multiple years based on various factors. Additionally, the separate financial systems may include separate features, such as branding, labeling, authentication processes or systems, and the like, that are intended to be integrated. But, integrating the separate features (e.g., the labeling) can be successfully completed over a much shorter amount of time than integrating the account data. During the certain time period, users may attempt to access the account data for requesting functions to be executed in which the functions may include financial functions such as transferring money, paying bills, etc. But, challenges can arise from accessing account data in separate financial systems to request to execute functions using integrated labeling or integrated authentication. For example, a user may request to pay a mortgage bill. In this example, one financial system may use a first process (e.g., associated with a first authentication) to pay the mortgage bill while the second financial system may use a second process (e.g., associated with a second authentication), which is different from the first process, to pay the mortgage bill. The integrated labeling may include a mortgage bill pay process, but the mortgage bill pay process may be different from the first process and from the second process and may not be viable or otherwise successful until the account data is integrated. Additionally, the integrated labeling may use or otherwise be based on an authentication that is different than the first authentication, the second authentication, or a combination thereof and that may not be viable or otherwise successful until the account data is integrated.

To address the challenges, a system of an API server on top of a user interface server can be used. In some examples, the API server can be communicatively coupled, via network connections or other suitable means, to the financial systems and to the user interface server. Having the API server between the user interface server and the financial systems can allow users to request functions be executed using different processes associated with the financial systems using the integrated labeling. The API server can receive input from the common user interface, can transmit a request to execute a function based on a certain process to the correct financial system, and can transmit the results of executing the function using the certain process to the common user interface.

In certain examples, the user interface server can be configured to present a common user interface that includes the integrated labeling to a user for receiving user data and a request to perform a function that can include the financial functions. The user interface server may be configured to, in response to receiving the request and the user data, transmit the request and the user data to the API server, and the API server may be configured to determine, based on the user data or other suitable information, a data system with which the request is to be executed. The API server may be configured to make an API call to the data system for causing the data system to execute the requested function based on a process associated with the data system. The API server may be configured to receive one or more results from executing the requested function, and the API server may be configured to transmit the results to the user interface server. The user interface server may be configured to output the common user interface that includes the integrated labeling and the results to the user device for viewing the results on the user device.

The financial systems may include a first financial account data system and a second financial account data system. The distinct processes may include a first process associated with the first financial account data system and may include a second process associated with the second financial account data system. The API may be included in program code on a first server, or an API server, and the common user interface may be included in program code on a second server, or a user interface server. In some examples, the API and the user interface may be included on program code on a single server in which the single server may be configured to perform a combination of the tasks that the API server and the user interface server are configured to perform.

The user interface server may present the common user interface to a user by outputting the common user interface to a user device such as a mobile computing device, a desktop computing device, and the like. The user interface server may receive, via the common user interface, a request to perform a function and user data. The function may include various financial functions such as transferring money, paying bills, etc., and the user data may include personal information such as a username and password combination and other suitable personal information. The user interface server may transmit the request and the user data to the API server for determining a data system with which to execute the requested function. The data system may be the first financial account data system or the second financial account data system. The API server may receive the request to execute the function and the user data, and, based on the user data, the API server may determine the data system for making an API call to cause the data system to execute the requested function.

In an example in which the data system is the first financial account data system, the API server may make the API call to the first financial account data system to cause the first financial account data system to execute the requested function. The first financial account data system may execute the requested function using the first process, and results of the execution may be received by the API server. The API server may transmit the results to the user interface server, and the user interface server may output the common user interface including the results for display on the user device for viewing the results. In an example in which the data system is the second financial account data system, the API server may make the API call to the second financial account data system to cause the second financial account data system to execute the requested function. The second financial account data system may execute the requested function using the second process, and results of the execution may be received by the API server. The API server may transmit the results to the user interface server, and the user interface server may output the common user interface including the results for display on the user device for viewing the results.

In some examples, the user interface server, the API server, or a combination thereof can be communicatively coupled to an authentication service. The authentication service may be separate from the user interface server and the API server or may be included in program code on the API server or the user interface server. For example, the authentication service can be included in program code on an authentication server that is communicatively coupled to the API server, the user interface server, or a combination thereof.

The authentication service can be used to authenticate data or a request with respect to the first financial system associated with the first process, the second financial system associated with the second process, or any other suitable data received via the common user interface. For example, user data can be received via the common user interface, and the user data can include a request to perform the first process or the second process. The API server can determine a corresponding authentication process for authenticating the user data. For example, the first process may be authenticated using a first authentication process, and the second process may be authenticated using a second authentication process, which is different than the first authentication process. In some examples, the API server can use the authentication service to determine the corresponding authentication process. Additionally or alternatively, the API server (or the common user interface server) may use the authentication service to perform the corresponding authentication process to authenticate the user data prior to performing the requested function.

In the following description, for the purposes of explanation, specific details are set forth in order to provide a thorough understanding of various implementations and examples. Various implementations may be practiced without these specific details. The figures and description are not intended to be restrictive.

Figure 1:
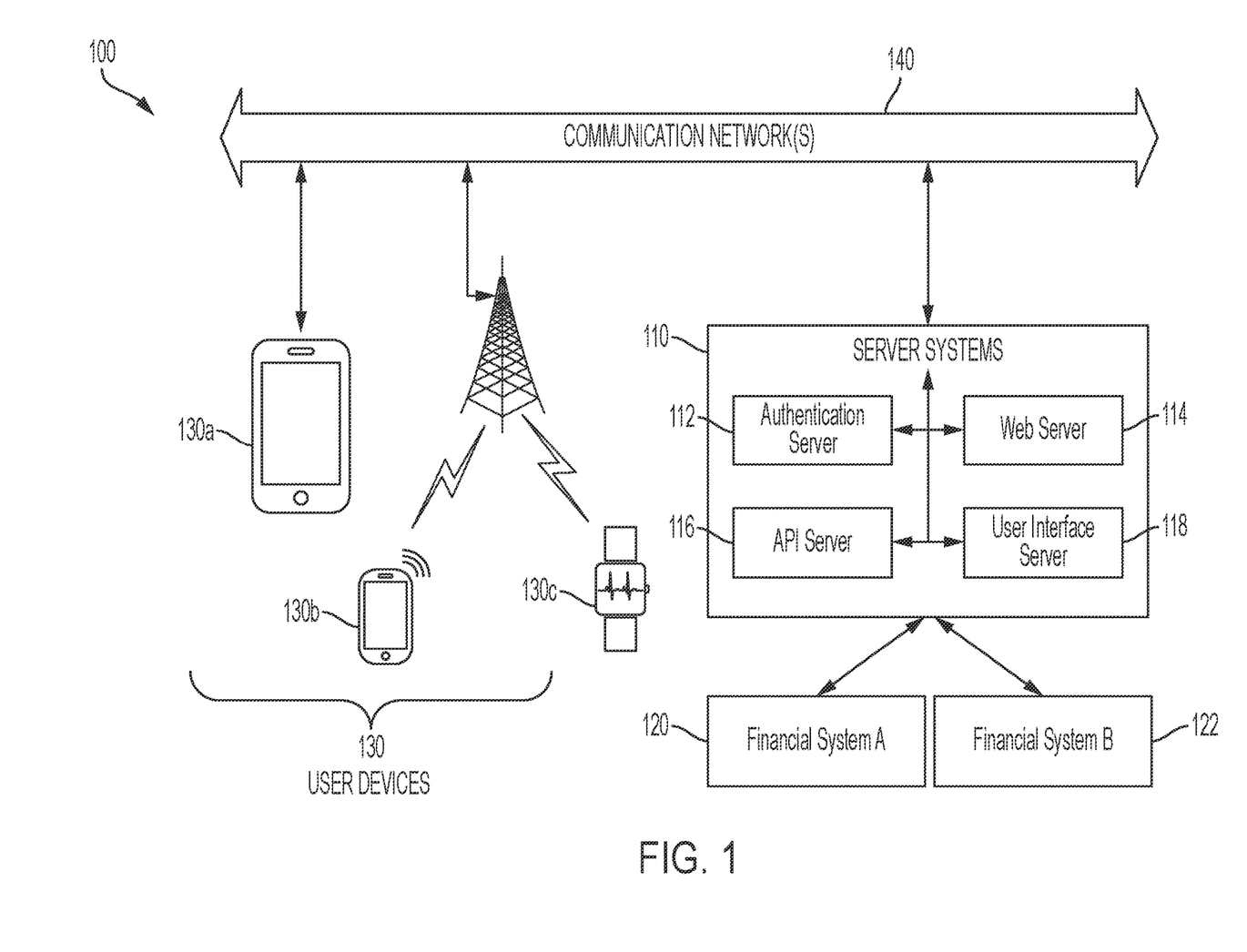
FIG. 1 is a schematic of a network environment in which a common user interface can be provided to access data from separate financial systems for performing requested functions according to one aspect of the present disclosure.

FIG. 1 is a schematic of a network environment 100 in which a common user interface can be provided to access data from separate financial systems for performing requested functions according to one aspect of the present disclosure. Included in the network environment 100 are user devices 130, one or more communication networks 140, and a server system 110. The user devices 130 may request and access resources within the server system 110 over one or more communications networks 140. The network environment 100 may correspond to a Wide Area Network ("WAN") environment, such as the Internet, through which user devices 130 may communicate with servers via web browsers or client-side applications, to establish communication sessions, request and receive web-based resources, and access other features of applications or services.

The server system 110 may be communicatively coupled to financial system A 120 and to financial system B 122 through one or more networks. In some examples, the server system 110 can be communicatively coupled to any other amount (e.g., three, four, five, six or more, etc.) of financial systems. In other examples, system A 120, system B 122, and any other systems communicatively coupled to the server system 110 can be non-financial systems such as communication systems (e.g., cellular service provider systems), energy provider systems, chemical manufacturing systems, and the like. The financial system A 120 and the financial system B 122 may be financial account data systems that include account data that are intended to be integrated but that are currently separate. The server system 110 may be or include any type of server including, for example, a rack server, a tower server, a miniature server, a blade server, a mini rack server, a mobile server, an ultra-dense server, a super server, or the like. The server system 110 may include various hardware components such as, for example, a motherboard, processing units, memory systems, hard drives, network interfaces, power supplies, etc. The server system 110 may include one or more server farms, clusters, or any other appropriate arrangement or combination of computer servers. Additionally, the server system 110 may act according to stored instructions located in a memory subsystem of the server system 110 and may execute an operating system or other applications. In some examples, the server system 110 may be a cloud-hosted system that exists on a server-less, cloud-based environment.

The server system 110 may implement several different applications and services, and perform additional server-side functionality, including by an authentication server 112, a web server 114, an API server 116, and a user interface server 118. For example, in implementations of banking or financial services systems, electronic commerce systems, and the like, the web-based resources provided by web server 114 may be used by user devices 130 to access account information and perform various functions related to multiple financial accounts. The API server 116 may be communicatively coupled to the user interface server 118, to the financial system A 120, and to the financial system B 122, such that the API server 116 can make API calls to the financial system A 120 and to the financial system B 122 based on input from the user interface server 118. The API calls may include requests to execute certain financial functions, such as transferring money, paying bills, etc., and the financial system A 120 and the financial system B 122 may execute the financial functions using a first process and using a second process, respectively, in which the first process and the second process are different. The financial system A 120 and the financial system B 122 may store information for the server system 110 to implement functions relating to account access, permissions, financial services, and the like. In some examples, the API server 116 and the user interface server 118 are a single server that may perform a combination of functions associated with the API server 116 and the user interface server 118.

The financial systems 120 and 122 can include a profile of known devices and behaviors of each user for each account held by a user. For example, the user may hold at least one account with financial system A 120, at least one account with financial system B 122, or a combination thereof. In some examples in which the user holds more than one account, the user may typically use a desktop computer to access information related to a first account, while more often use a mobile device 130 to access information related to a second account. The server system 110 or the financial systems 120 and 122 may record these user activity observations over time as a user profile for the server system 110 for use in authentication, in determining a data system, or other suitable uses. The financial systems 120 and 122 may additionally or alternatively include a set of defined rules configurable by the user or entity providing the account services.

The user devices 130, which can include suitable user devices for accessing web-based resources or application-based resources, can be capable of accessing and establishing communication sessions with the server system 110 and the financial systems 120 and 122 through the communication networks 140. As illustrated in FIG. 1, user devices 130a-130c correspond to mobile devices, including tablet computers 130a, smartphones 130b, and smart watches 130c, which may access the server system 110 via a Local Area Network ("LAN") or Wide Area Network (WAN), as well as mobile telecommunication networks, short-range wireless networks, or various other communication network types (e.g., cable or satellite networks). Although certain examples herein are described in terms of mobile devices 130, in other examples, the user devices 130 may additionally or alternatively include other mobile or non-mobile computing devices (e.g., desktop computers, laptop computers, and the like) capable of accessing the server system 110 via the communications network 140.

Although certain components are shown in FIG. 1, other suitable, compatible, network hardware components and network architecture designs may be implemented in various embodiments to support communication between the server system 110, the financial systems 120 and 122, and various user devices 130. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the user devices 130 and server system 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
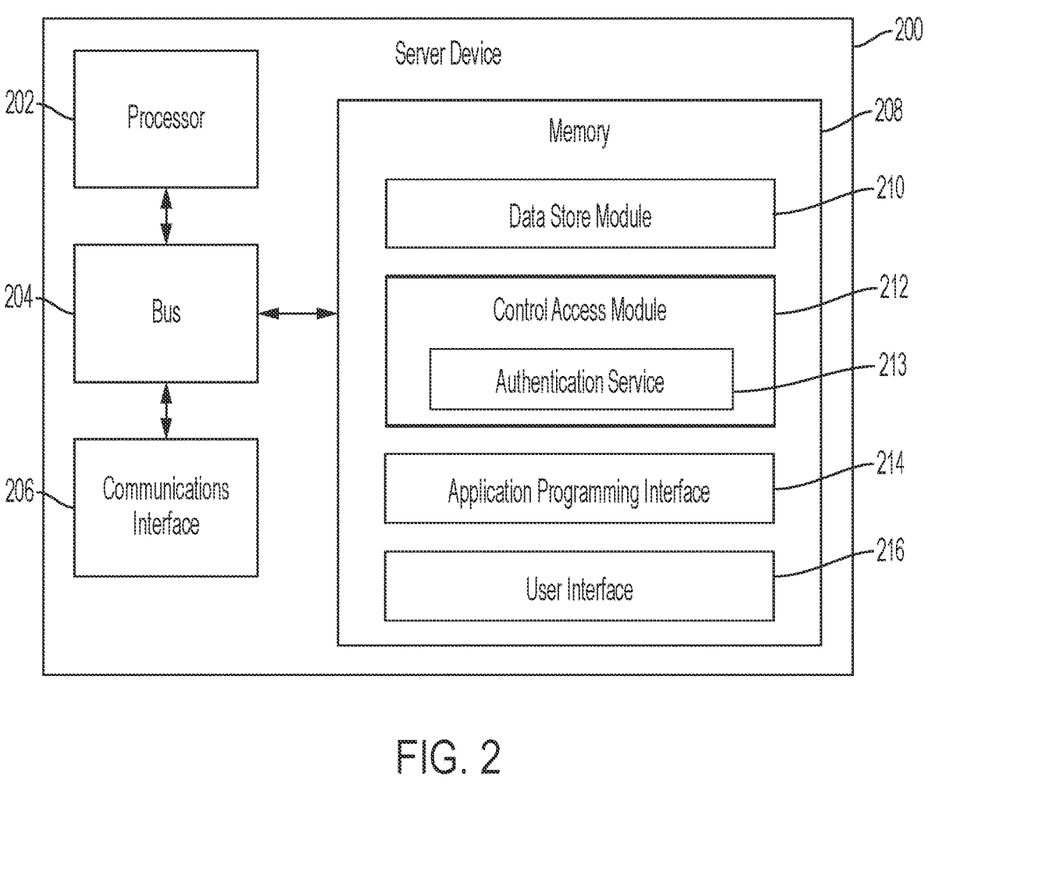
FIG. 2 is a block diagram of an example of a server device configured to execute programming code to execute application program interface calls to separate financial systems according to one example of the present disclosure.

FIG. 2 is a block diagram of an example of a server device 200 configured to execute programming code to execute API calls to separate financial systems according to one example of the present disclosure. The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for determining a data system among a first financial system and a second financial system with which to execute a function. The program code may cause the server device 200, or any component within the server device 200, to make API calls to the determined data system to access a user account. The API calls may cause the function to be performed in response to receiving data and a request from a common user interface. The memory 208 may additionally include program code for a data store module 210, a control access module 212, an API 214, and a user interface 216. In some examples, the API 214 perform functions including making API calls for causing the function to be executed, for retrieving financial account information based on the executed function, etc. In some examples, the user interface 216 may be a common user interface in that the user interface 216 may be presented to a user on a user device, such as the user device 130 of FIG. 1, to allow the server device 200 to receive user input that can be used to perform functions. Examples of functions can include determining the data system with which to execute the function, retrieving financial account information based on the executed function, etc.

The data store module 210 may store information relating to a user account (e.g., username and password, security information, transactional data) for a number of users and client devices 130, including originating IP addresses of login attempts, browser settings of login attempts, etc. The control access module 212 may include or be communicatively coupled to an authentication service 213 and may validate whether a user access attempt has been successfully authenticated after a user has entered correct account login information. In some cases, the control access module 212 may additionally or alternatively determine the data system associated with account information of the user. The results from the control access module 212 may be used by the API 214 to request access to the user account, to determine an authentication process to perform with respect to the requested function, to authenticate the requested function (e.g., via the determined authentication process), and to cause the requested function to be executed. Additionally or alternatively, the results from the control access module 212 may be used by the user interface 216 or the server device 200 to send a request for data or to send a request to execute a function to an API such as the API 214.

In some examples, the API 214 and the common user interface 216 may be unintegrated or otherwise distributed among more than one server. For example, instead of the API 214 and the common user interface 216 being included in the server device 200, the API 214 can be included in a first server and the common user interface 216 can be included in a second server. In this example, the first server and the second server may include separate housings, separate processors, separate memory, etc. The first server may be configured to perform the functions associated with the API 214, and the second server may be configured to perform the functions associated with the common user interface 216. In combination, the first server and the second server may be configured to perform the functions of the server device 200.

Figure 3:
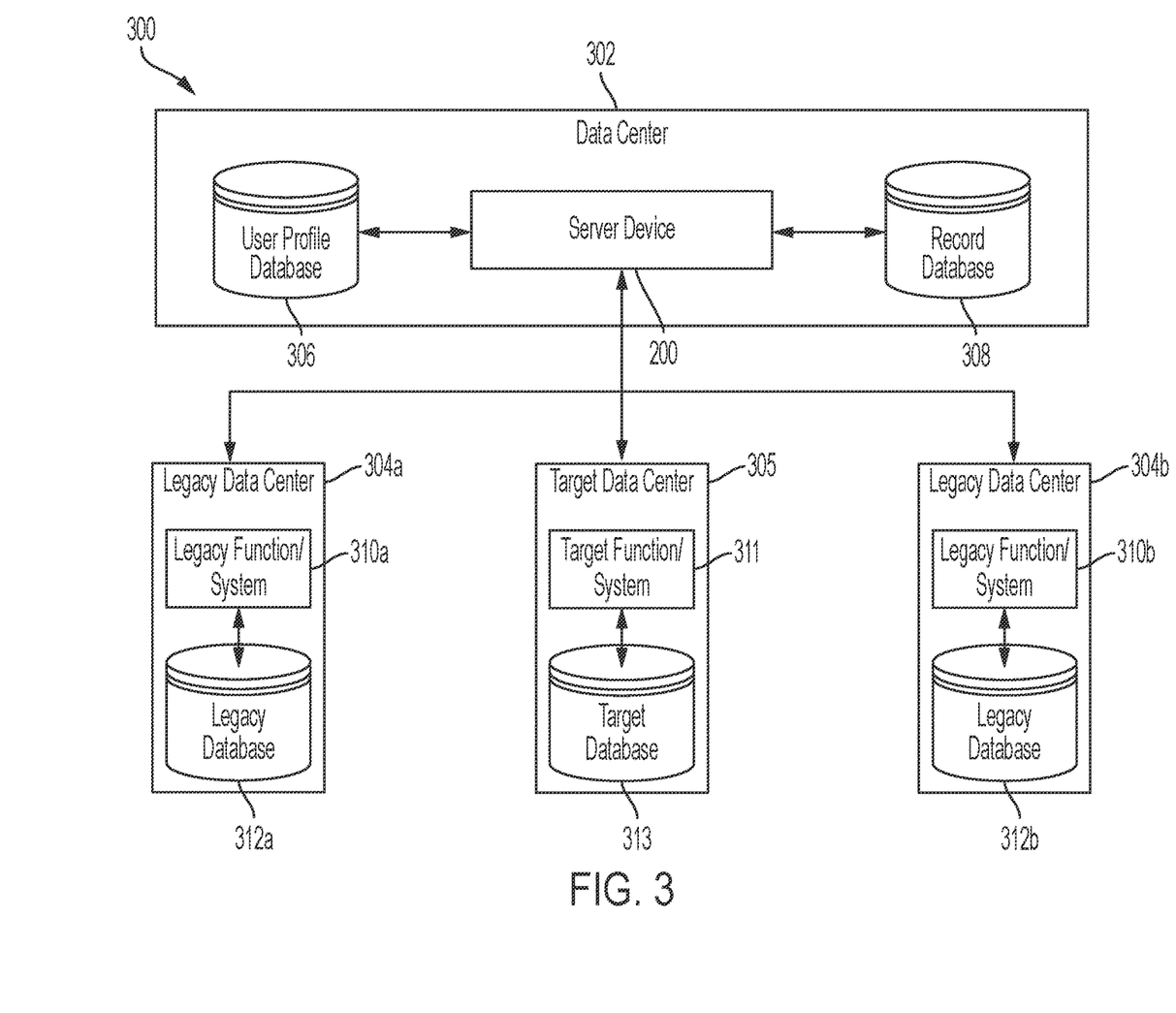
FIG. 3 is a block diagram of an example of a computing environment for using an application programming interface to cause a requested function received via a common user interface to be executed according to one example of the present disclosure.

FIG. 3 is a block diagram of an example of a computing environment 300 for using an API to cause a requested function received via a common user interface to be executed according to one example of the present disclosure. The computing environment 300 includes a data system 302, two legacy data centers 304a-b, and a target data center 305, as examples. Other suitable components or any number of various components can be included in the computing environment 300, including multiple server devices 200, such as in a cloud computing environment. The data system 302 may include a user profile database 306, the server device 200, and a record database 308. The server device 200 may be communicatively coupled to the user profile database 306 and to the record database 308. In some examples, the data system 302 may include one or more servers in addition to, or instead of, the server device 200. For example, a first server can include the API 214, and a second server can include the common user interface 216. In this example, the first server can be communicatively coupled to the second server and the record database 308, and the second server can be communicatively coupled to the first server and to the user profile database 306. In other examples, the server device 200 can include the API 214 and the common user interface 216.

The server device 200 can additionally be communicatively coupled to the legacy data centers 304 and to the target data center 305. The legacy data centers 304 and the target data center 305 are illustrated in the computing environment 300, but other suitable amounts of data centers can be included in the computing environment 300. Each legacy data center 304 may include a legacy function or system 310 and a legacy database 312. For example, legacy functions or systems 310a-b and legacy databases 312a-b can be included in, and can correspond to, the legacy data centers 304a-b. Additionally or alternatively, the target data center 305 can include a target function or system 311 and a target database 313. The target function or system 311 and the target database 313 may be similar or identical to, or may perform functions similar or identical to, the legacy function or system 310 and the legacy database 312, respectively. Each legacy function or system 310 may be communicatively coupled to a corresponding legacy database 312. For example, the legacy function or system 310b may be included in a bill-pay server that can be communicatively coupled to the legacy database 312b. The legacy functions or systems 310a-b can be similar or identical in which each legacy function or system 310 can perform a function similar or identical to a function of an additional legacy function or system 310. For example, the legacy function or system 310a and the legacy function or system 310b may, when executed via an API call from the server device 200, cause resources to be transferred from a first account to a second account. In other examples, the legacy functions or systems 310a-b may perform different functions. For example, the legacy function or system 310a may perform a bill-pay function and the legacy function or system 310b may perform a resource-transfer function. In some examples, one or more legacy data centers 304 may include more than one legacy function or system 310. For example, the legacy data center 304a may include three legacy functions or systems 310, the legacy data center 304b may include one legacy function or system 310b, etc. The target function or system 311 may perform similar functions to those of the legacy functions or systems 310 but may perform the similar functions using different processes. For example, the legacy function or system 310a may perform a bill pay function using a first process, and the target function or system 311 may perform the bill pay function using a second process. The first process and the second process can yield identical results.

The server device 200 may receive a request from a user to access one or more legacy data centers 304 for performing one or more legacy functions. In some examples, the server device 200 can include a common, or otherwise single, authentication system, for example via the common user interface 216, for users that request access to one or more legacy data centers 304. The server device 200 may access the user profile database 306 to access data to determine to which legacy data center 304 to make an API call. For example, the server device 200 can receive authentication information from a user. The server device 200 can use the authentication information to access the user profile database 306 to receive data that determines to which legacy data center 304 to make the API call. Additionally or alternatively, the server device 200 can use the authentication information from the user to execute the API call to the target data center 305.

The server device 200 may be configured to make API calls to one or more legacy data centers 304 or to the target data center 305. In some examples, the server device 200 may function as middleware that directs API calls, or other network traffic, between one or more respective legacy data centers 304 or the target data center 305 and the common user interface 216. Additionally or alternatively, the server device 200 may be configured to translate account data, or other suitable computer-readable data structures from the legacy data centers 304, from the target data center 305, or from other suitable components of the computing environment 300. In some examples, the server device 200 decouples data from the data system 302. In these examples, the server device 200 can use the decoupled data to communicate with the legacy data centers 304.

In response to receiving user authentication information, or other suitable user input, the server device 200 may execute the API call to the legacy data center 304 or to the target data center 305. In some examples, the server device 200 executes the API call to one or more legacy data centers 304 or to the target data center 305 for executing requested functions. In response to the legacy data center 304 or the target data center 305 executing the requested function, the server device 200 may receive, from the legacy data center 304 or the target data center 305, an additional API call that includes a result of the executed function and associated information. In response to receiving the additional API call, the server device 200 may output the results for display to the user. In some examples, the server device 200 outputs the results to the common user interface 216 for display to the user on the common user interface 216. Additionally or alternatively, the server device 200 may transmit the information associated with the results to the record database 308 for storage. In some examples, the information associated with the results can include the associated legacy data center 304 or target data center 305, the executed or legacy function or system 310, a date of the request, user identification information, and other suitable information associated with the results of the executed function.

Figure 4:
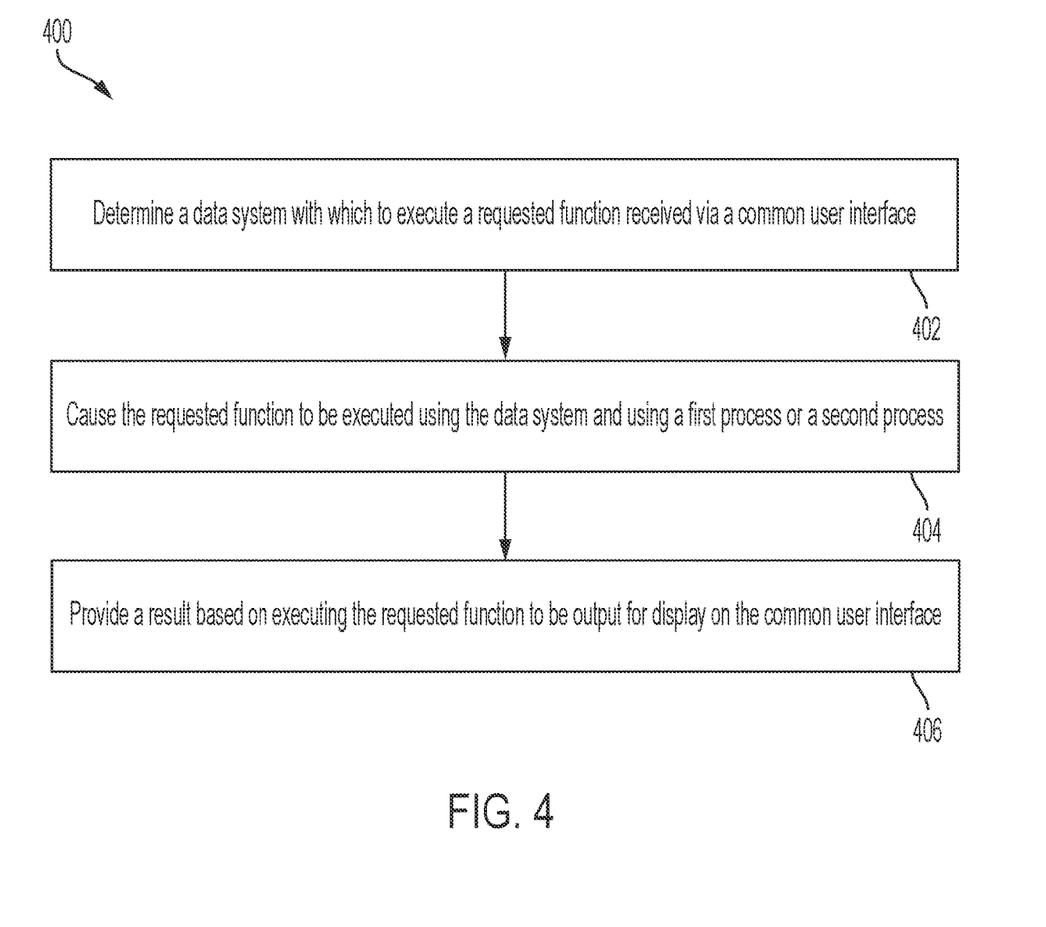
FIG. 4 is a flowchart of a process for using an application programming interface to cause a requested function received via a common user interface to be executed according to one example of the present disclosure.

FIG. 4 is a flowchart of a process 400 for using an API to cause a requested function received via a common user interface to be executed according to one example of the present disclosure. At block 402, a server, such as the server device 200, determines a data system with which to execute a requested function received via a common user interface. The requested function, in addition to user data, may be input into the common user interface via a user device such as the user device 130. The requested function may involve executing a first process associated with a first financial account data system or may involve executing a second process associated with a second financial account data system. The first process may be different from the second process. The server may determine the data system using the user data input into the common user interface. For example, the user data may include a username and password combination that may indicate that the user holds an account included in the first financial account data system or in the second financial account data system.

At block 404, the server causes the requested function to be executed using the data system determined at block 402 and using the first process or the second process. In some examples, in response to determining the data system, the server may use an API, such as the API 214 of FIG. 2, to make an API call to the data system to cause the requested function to be executed. For example, if the determined data system is the first financial account data system, the API may make the API call to the first financial account data system to cause the requested function to be executed using the first process. In an example in which the determined data system is the second financial account data system, the API may make the API call to the second financial account data system to cause the requested function to be executed using the second process. Whether the determined data system is the first financial account data system, the second financial account data system, or a different financial account data system, the server may receive a result of executing the requested function.

At block 406, the server provides a result based on executing the requested function to be output for display on the common user interface. The result based on executing the requested function may be received by the server in response to the server making the API call to cause the requested function to be executed. The server may transmit the result to a different server that includes program code for generating and outputting a common user interface, such as the user interface 216 of FIG. 2. The result may be transmitted such that the result is capable of being output for display and viewable on the user device 130 or other suitable user device.

Figure 5:
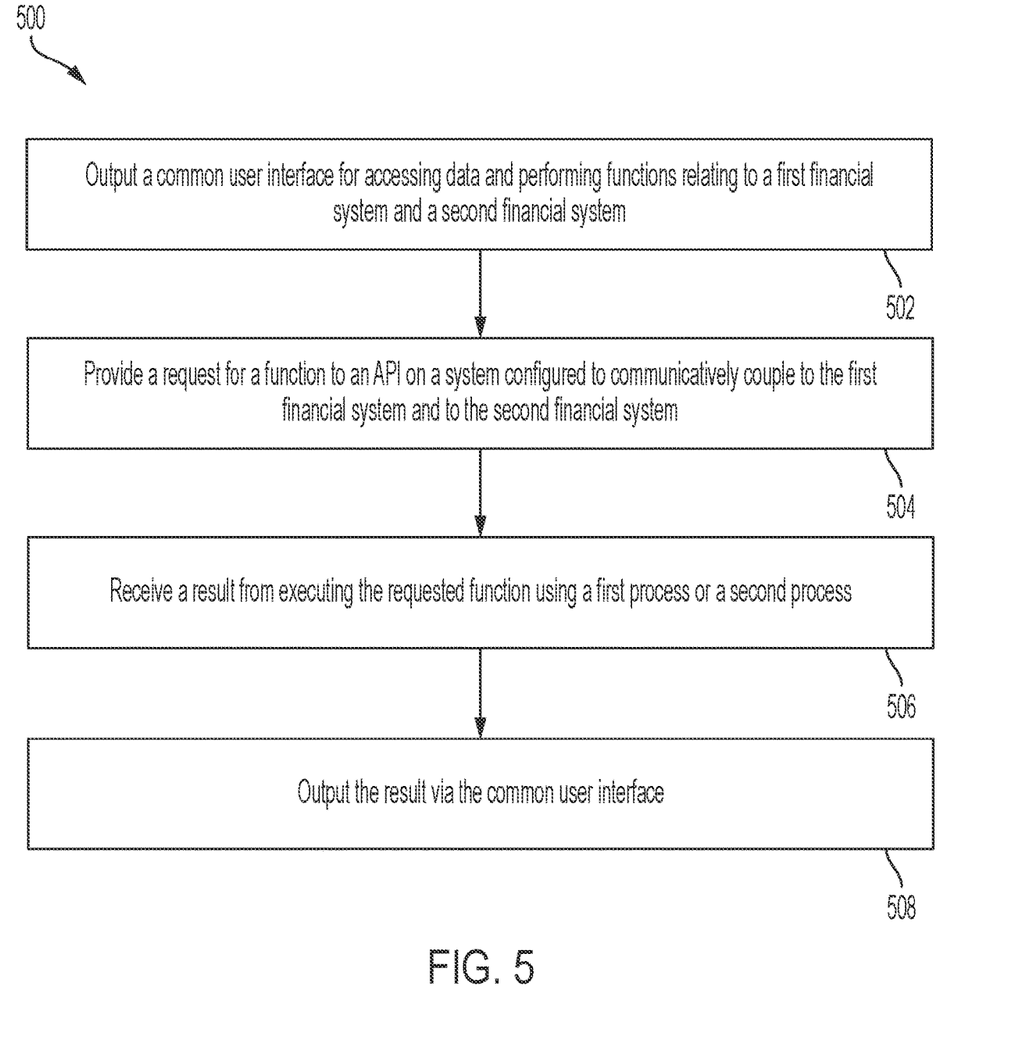
FIG. 5 is a flowchart of a process for using a common user interface for accessing data and performing functions relating to a first financial account data system and to a second financial account data system according to one example of the present disclosure.

FIG. 5 is a flowchart of a process 500 for using a common user interface for accessing data and performing functions relating to a first financial account data system and to a second financial account data system according to one example of the present disclosure. At block 502, a server, such as the server device 200 of FIG. 2, outputs a common user interface, such as the user interface 216 of FIG. 2, that is configured to transmit requests for executing functions associated with the first financial account data system and the second financial account data system. The function can be executed based on a first process associated with the first financial account data system or based on a second process associated with the second financial account data system. In outputting the common user interface, the server may transmit the common user interface to a user device such as the user device 130. The common user interface may additionally be configured to receive user data from the user device for subsequent use in executing requested function.

At block 504, the server provides a request for the function to be executed to an API, such as the API 214 of FIG. 2, on a system configured to communicatively couple to the first financial account data system and to the second financial account data system. In some examples, the system can be the server device 200 of FIG. 2, and the server can transmit the request to the system. The server may additionally transmit the user data to the system for determining a data system with which to execute the requested function in which the data system may be the first financial account data system or the second financial account data system. The system may be configured to, in response to receiving the request, make an API call to the first financial account data system or to the second financial account data system for executing the function. The function may be executed via a first process associated with the first account data system or via a second process associated with the second account data system, in which the first process is different from the second process.

At block 506, the server receives a result from an execution of the requested function using the first process or using the second process. The result may be received by the server from the system that includes the API. The result of the requested function may be determined by executing the first process, or by executing the second process, in response to transmitting the request to execute the requested function to the first financial account data system or to the second financial account data system, respectively.

At block 508, the server outputs the result via the common user interface. In response to receiving the result at the block 506, the server may generate the common user interface including the result. The server may transmit the generated common user interface to the user device for displaying the result such that the result is viewable by a user of the user device.

Figure 6:
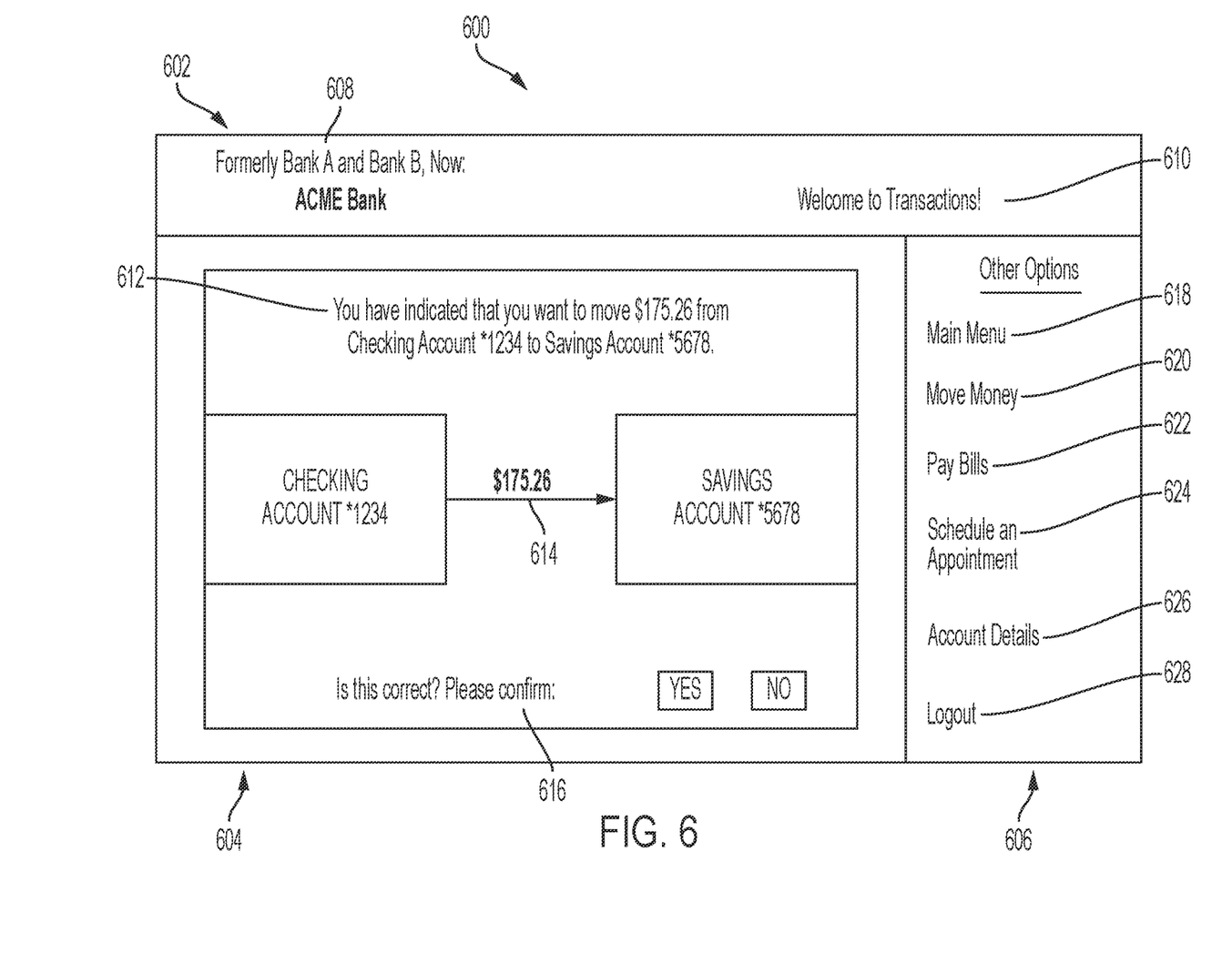
FIG. 6 is an example of a common user interface used for accessing data and performing functions relating to a first financial account data system and to a second financial account data system according to one example of the present disclosure.

FIG. 6 is an example of a common user interface 600 used for accessing data and performing functions relating to a first financial account data system and to a second financial account data system according to one example of the present disclosure. The common user interface 600 may include a title bar 602, a main portion 604, and an options panel 606. The common user interface 600 may additionally or alternatively include other entities for accessing data and for performing functions relating to the first financial account data system and to the second financial account data system. As illustrated, the title bar 602 includes a title 608, and a message 610. The title 608 may include information relating to the first financial account data system and the second financial account data system. For example, as illustrated, the title 608 recites, "Formerly Bank A and Bank B Now: ACME Bank," in which Bank A may be associated with the first financial account data system and Bank B may be associated with the second financial account data system. The message 610 may include a word or a set of words indicating the functions relating to the first financial account data system or to the second financial account data system. For example, as illustrated, the message 610 recites, "Welcome to Transactions!" since the common user interface 600 depicts a page for use in making transactions.

As shown in FIG. 6, the main portion 604 of the common user interface includes a notification 612, a potential transaction 614, and a confirmation option 616 to confirm or deny the potential transaction 614. The notification 612 may include a word or a set of words indicating a request that was made to execute a function. For example, the notification 612 recites, "You have indicated that you want to move $175.26 from Checking Account *1234 to Savings Account *5678," which indicates that the common user interface 600 was used to request the function be executed for transferring money. The potential transaction 614 may visually indicate the requested function to be executed. For example, as illustrated in FIG. 6, the potential transaction 614 is visually shown as moving $175.26 from the checking account *1234 to the savings account *5678. The confirmation option 616 may include an option for a user of the common user interface 600 to accept or to deny the potential transaction 614. If the user accepts the potential transaction 614, the common user interface 600 may transmit a request to perform the function of moving money to a system that includes an API, such as the server device 200 and the API 214 of FIG. 2, for making an API call to cause the requested function to be executed.

In some examples, the common user interface 600 may include the options panel 606 for navigating a user to a different page of the common user interface 600 for requesting an additional or alternative function to be executed. As illustrated in FIG. 6, the options panel 606 includes options to return to the main menu 618, to request to move money 620, to request to pay bills 622, to schedule an appointment 624, to request to view account details 626, and to logout 628. The request to move money 620 may navigate the user to a different page of the common user interface to request execution of a function to move money from the user account to a different account. The request to pay bills 622 may navigate the user to a different page of the common user interface to request execution of a function to pay bills such as a mortgage bills, utility bills, auto loans, etc. The options panel 606 may include additional or alternative options for navigating the user to different pages of the common user interface 600 to request execution of other functions.

Figure 7:
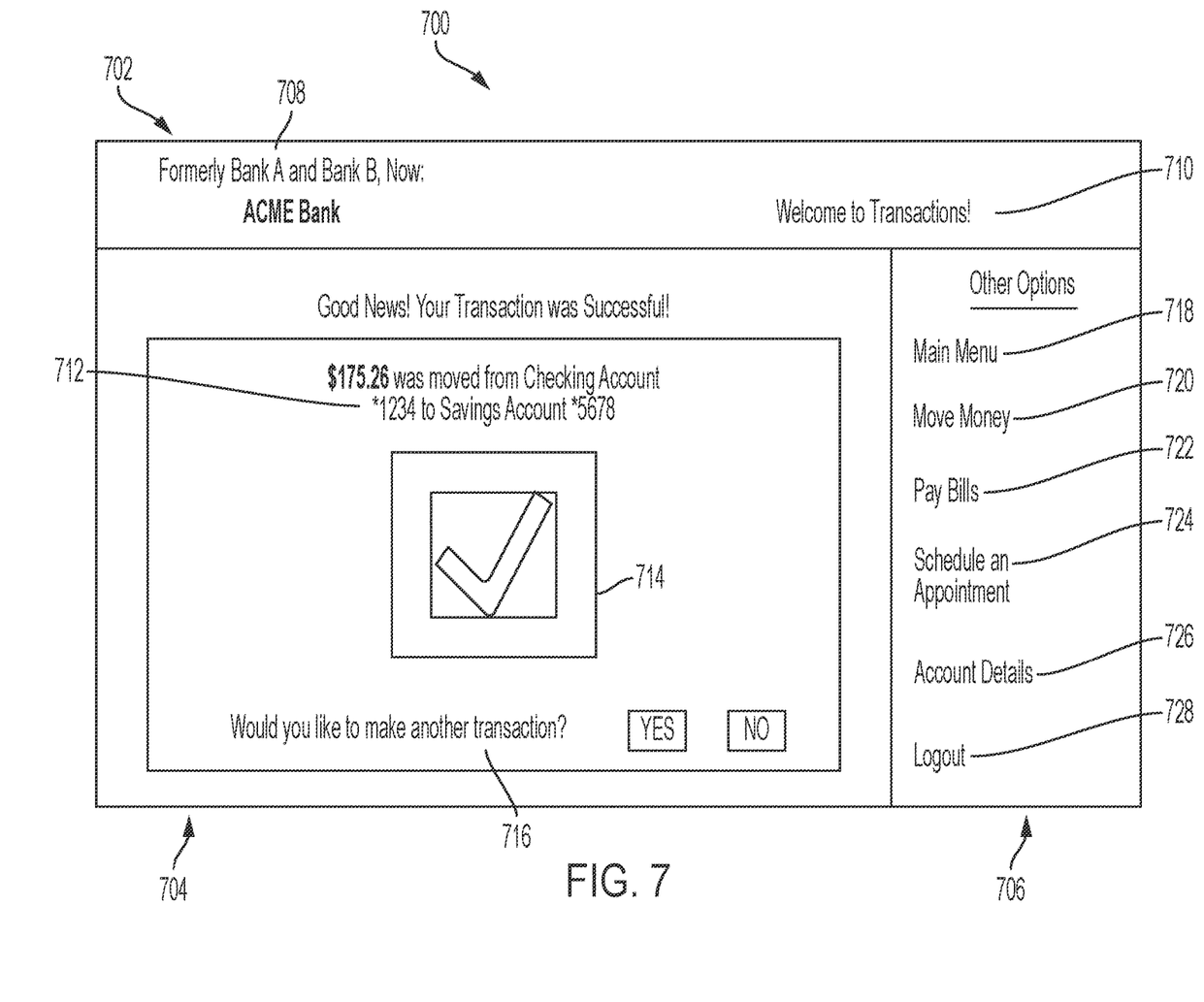
FIG. 7 is an example of an output of a common user interface used for accessing data and performing functions relating to a first financial account data system and to a second financial account data system according to one example of the present disclosure.

FIG. 7 is an example of an output of a common user interface 700 used for accessing data and performing functions relating to a first financial account data system and to a second financial account data system according to one example of the present disclosure. In some examples, the common user interface 700 includes a result of a request made by the common user interface 600 to execute a function. Similar to the common user interface 600, the common user interface 700 may include a title bar 702, a main portion 704, and an options panel 706. The common user interface 700 may additionally or alternatively include other entities for presenting results in response to accessing data and for performing functions relating to the first financial account data system and to the second financial account data system. As illustrated, the title bar 702 includes a title 708, and a message 710. The title 708 may include information relating to the first financial account data system and the second financial account data system. For example, as illustrated, the title 708 recites, "Formerly Bank A and Bank B Now: ACME Bank," in which Bank A may be associated with the first financial account data system and Bank B may be associated with the second financial account data system. The message 710 may include a word or a set of words indicating the functions relating to the first financial account data system or to the second financial account data system. For example, as illustrated, the message 710 recites, "Welcome to Transactions!" since the common user interface 700 depicts a page for use in displaying the result of executing the requested function for making transactions.

As shown in FIG. 7, the main portion 704 of the common user interface 700 includes a confirmation statement 712, a confirmation symbol 714, and an option 716 to perform an additional function. The confirmation statement 712 may include a word or a set of words indicating whether the requested function or functions were performed successfully. The confirmation statement 712 of the common user interface 700 recites, "$175.26 was moved from Checking Account *1234 to Savings Account *5678," which indicates that the requested function of transferring money was successful. The confirmation symbol 714 may include a check mark, an X, an exclamation point, etc. As illustrated on the common user interface 700, the confirmation symbol 714 is a check mark indicating that the requested function was successfully executed. The option 716 may include suitable options for requesting additional functions after attempting, whether successfully or otherwise, to execute the requested function.

In some examples, similar to the options panel of the common user interface 600, the common user interface 700 may include the options panel 706 for navigating a user to a different page of the common user interface 700 for requesting an additional or alternative function to be executed. As illustrated in FIG. 7, the options panel 706 includes options to return to the main menu 718, to request to move money 720, to request to pay bills 722, to schedule an appointment 724, to request to view account details 726, and to logout 728. The request to move money 720 may navigate the user to a different page of the common user interface to request execution of a function to move money from the user account to a different account. The request to pay bills 722 may navigate the user to a different page of the common user interface to request execution of a function to pay bills such as a mortgage bills, utility bills, auto loans, etc. The options panel 706 may include additional or alternative options for navigating the user to different pages of the common user interface 700 to request execution of other functions.

In some examples, a first user and a second user that respectively hold an account included in the first financial account data system and in the second financial account data system may use the common user interface 600 to request to pay an electric bill. For the first user, in response to the user confirming the potential transaction 614, the common user interface 600 may transmit the request to an API, such as the API 214 of FIG. 2, to make an API call to the first financial account data system to access the account of the first user. The API may cause the first financial account data system to execute a first process to pay the electric bill of the first user. The API may transmit results of executing the first process to the common user interface 700 for display to the first user. For the second user, in response to the user confirming the potential transaction 614, the common user interface 600 may transmit the request to the API to make an API call to the second financial account data system to access the account of the second user. The API may cause the second financial account data system to execute a second process to pay the electric bill of the second user. The API may transmit results of executing the second process to the common user interface 700 for display to the second user. While two different processes may have been executed to perform the requested function of paying the electric bill, the common user interfaces 600 and 700 for requesting the function and for displaying the results may be displayed and used in a common manner between the first user and the second user.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. And, although the subject matter has been described with reference to financial account systems and financial account data, various aspects disclosed herein can be applicable to other types of account systems and other types of data.

The invention claimed is:

1. A server comprising:
   a processor device; and
   a non-transitory computer-readable memory having an application programming interface that is executable by the processor device to perform an operation to cause the server to perform operations comprising:
     receiving, via integrated labeling of a common user interface, input data from an entity, the input data including an indication of a requested function, the integrated labeling being generic with respect to a first banking account data system and a second banking account data system, the integrated labeling representing an integration of the first banking account data system and the second banking account data system at a future time;
     identifying a user profile associated with the input data, the user profile including historical data associated with the entity, the identifying including comparing the input data with data included in a plurality of existing user profiles to identify, among the plurality of existing user profiles, the user profile, wherein the plurality of existing user profiles comprises a first subset of user profiles associated with the first banking account data system and a second subset of user profiles associated with the second banking account data system, and wherein the plurality of existing user profiles indicates known devices and known behaviors;
     determining, using the historical data associated with the entity, a data system, among the first banking account data system and the second banking account data system, with which to execute the requested function based on the identified user profile being included in the first subset of user profiles or the second subset of user profiles, the first banking account data system having first account data stored thereon and being configured to perform (i) at least one function according to a first process and using the first account data, and (ii) a first authentication process to authenticate, based on the input data, a request to perform the first process, the second banking account data system having second account data stored thereon that is unintegrated with the first account data, the second banking account data system being configured to perform (i) at least one function according to a second process and using the second account data, and (ii) a second authentication process to authenticate, based on the input data, a request to perform the second process, the second process being different than the first process and the second authentication process being different than the first authentication process, the integrated labeling representing a process different than and generic to the first process and the second process and an authentication process different than and generic to the first authentication process and the second authentication process;
     causing the requested function to be executed using the data system and the first process or the second process; and
     providing a result from execution of the requested function to be output for display via the common user interface.

2. The server of claim 1, wherein the operation of causing the requested function to be executed includes executing an application programming interface call to the data system for transmitting the input data and the requested function to the data system.

3. The server of claim 1, wherein the operation of providing the result from the execution of the requested function includes executing an application programming interface call to the data system for receiving the result from the data system.

4. The server of claim 1, wherein the server is a first server, and wherein the operation of determining the data system includes receiving the requested function from a second server via the common user interface.

5. The server of claim 1, wherein the input data comprises user account data that is specific to and associated only with the data system with which to execute the function.

6. The server of claim 5, wherein the user account data comprises authentication data that is specific to and associated only with a particular authentication process of the first authentication process or the second authentication process.

7. The server of claim 6, wherein the operations are configured to be performed while the first account data of the first banking account data system and the second account data of the second banking account data system are being integrated.

8. A system comprising:
   a first banking account data system having first account data stored thereon and being configured to perform (i)

at least one function according to a first process and using the first account data, and (ii) a first authentication process to authenticate, based on input data, a request to perform the first process;

a second banking account data system having second account data stored thereon that is unintegrated with the first account data, the second banking account data system being configured to perform (i) at least one function according to a second process and using the second account data, and (ii) a second authentication process to authenticate, based on the input data, a request to perform the second process, the second process being different than the first process and the second authentication process being different than the first authentication process;

a server comprising a processor device and a non-transitory computer-readable memory having an application programming interface that is executable by the processor device to cause the server to perform operations comprising:

receiving, via a common user interface that is configured to provide integrated labeling, the input data from an entity, the input data including an indication of a requested function, the integrated labeling being generic with respect to the first banking account data system and the second banking account data system, the integrated labeling representing an integration of the first banking account data system and the second banking account data system at a future time;

identifying a user profile associated with the input data, the user profile including historical data associated with the entity, the identifying including comparing the input data with data included in a plurality of existing user profiles to identify, among the plurality of existing user profiles, the user profile, wherein the plurality of existing user profiles comprises a first subset of user profiles associated with the first banking account data system and a second subset of user profiles associated with the second banking account data system, and wherein the plurality of existing user profiles indicates known devices and known behaviors;

determining a data system, among the first banking account data system and the second banking account data system, with which to execute the requested function based on the identified user profile being included in the first subset of user profiles or the second subset of user profiles;

causing the requested function to be executed using the data system and the first process or the second process; and providing a result from execution of the requested function to be output for display via the common user interface.

9. The system of claim 8, wherein the operation of causing the requested function to be executed includes executing an application programming interface call to the data system for transmitting the input data and the requested function to the data system.

10. The system of claim 8, wherein the operation of providing the result from the execution of the requested function includes executing an application programming interface call to the data system for receiving the result from the data system.

11. The system of claim 8, wherein the server is a first server, and wherein the operation of determining the data system includes receiving the requested function from a second server via the common user interface.

12. A method comprising:

receiving, via integrated labeling of a common user interface, input data from an entity, the input data including an indication of a requested function, the integrated labeling being generic with respect to a first banking account data system and a second banking account data system, the integrated labeling representing an integration of the first banking account data system and the second banking account data system at a future time;

identifying a user profile associated with the input data, the user profile including historical data associated with the entity, the identifying including comparing the input data with data included in a plurality of existing user profiles to identify, among the plurality of existing user profiles, the user profile, wherein the plurality of existing user profiles comprises a first subset of user profiles associated with the first banking account data system and a second subset of user profiles associated with the second banking account data system, and wherein the plurality of existing user profiles indicates known devices and known behaviors;

determining, using the historical data associated with the entity, a data system, among the first banking account data system and the second banking account data system, with which to execute the requested function based on the identified user profile being included in the first subset of user profiles or the second subset of user profiles, the first banking account data system having first account data stored thereon and being configured to perform (i) at least one function according to a first process and using the first account data, and (ii) a first authentication process to authenticate, based on the input data, a request to perform the first process, the second banking account data system having second account data stored thereon that is unintegrated with the first account data, the second banking account data system being configured to perform (i) at least one function according to a second process and using the second account data, and (ii) a second authentication process to authenticate, based on the input data, a request to perform the second process, the second process being different than the first process and the second authentication process being different than the first authentication process, the integrated labeling representing a process different than and generic to the first process and the second process and an authentication process different than and generic to the first authentication process and the second authentication process;

causing the requested function to be executed using the data system and the first process or the second process; and providing a result from execution of the requested function to be output for display via the common user interface.

13. The method of claim 12, wherein causing the requested function to be executed includes executing an application programming interface call to the data system for transmitting the input data and the requested function to the data system.

14. The method of claim 12, wherein providing the result from the execution of the requested function includes executing an application programming interface call to the data system for receiving the result from the data system.

\* \* \* \* \*